J. G. MONCUS.
FLY TRAP.
APPLICATION FILED JAN. 25, 1910.
981,459.
Patented Jan. 10, 1911.
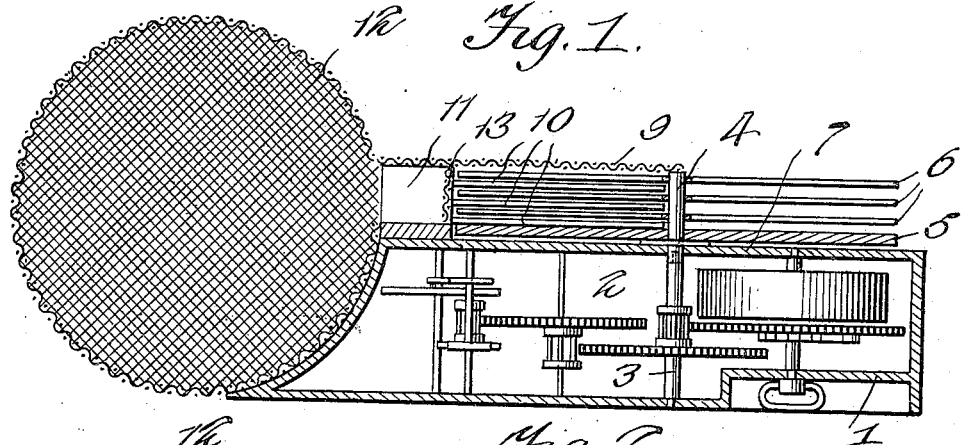
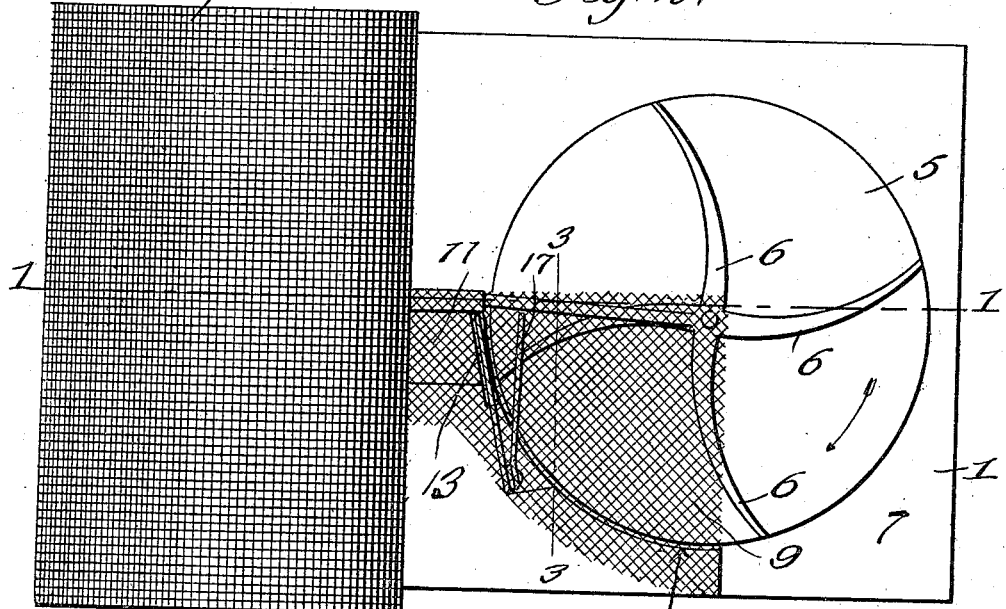
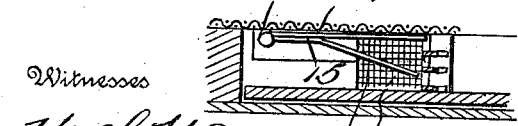
Witnesses
Hugh H. Ett
Wm J. Koerek
Inventor
Joseph G. Moncus
By Victor J. Evans
Attorney

UNITED STATES PATENT OFFICE.

JOSEPH GIDEON MONCUS, OF CROWELL, TEXAS.

FLY-TRAP.

981,459.　　　　　Specification of Letters Patent.　　Patented Jan. 10, 1911.

Application filed January 25, 1910. Serial No. 540,017.

*To all whom it may concern:*

Be it known that I, JOSEPH G. MONCUS, a citizen of the United States, residing at Crowell, in the county of Foard and State of Texas, have invented new and useful Improvements in Fly-Traps, of which the following is a specification.

This invention relates to insect traps and the object of the invention is to provide a comparatively simple, cheap and thoroughly effective device of this character whereby flies or other insects landing upon the revolving disk are conveyed to a suitable cage, the device being provided with a door communicating with the cage which is automatically operated by arms attached to the revolving disk and the said arms being also adapted to force the fly through the open doorway of the cage.

With the above, and other objects in view, which will appear as the description progresses, the invention resides in the novel construction and arrangement of parts hereinafter fully described and claimed.

In the accompanying drawings there has been illustrated a simple and preferred embodiment of the improvement, and in which drawings, Figure 1 is a longitudinal sectional view upon the line 1—1 of Fig. 2. Fig. 2 is a top plan view of the device. Fig. 3 is a detail transverse sectional view upon the line 3—3 of Fig. 2.

In the accompanying drawing the numeral 1 designates a suitable housing which is adapted for the reception of a motor power, such as a clock work designated by the numeral 2. The train of gears connected with the clock work mechanism 2 are so arranged as to revolve the central or operating spindle 3 at a comparatively low speed. The upper wall of the compartment 1 is provided with an opening alining with the spindle 3, and the said spindle has its upper extremity provided with a reduced non-circular projecting portion which is adapted for the reception of a non-circular bore provided within a shaft or spindle extension 4. The shaft 4 is securely connected with a disk 5 and the said shaft is also provided with a plurality of arms 6 preferably arranged at right angles to each other and positioned in series one above the other. The spaces between each of the series of arms are sufficiently slight as to prevent an insect crawling between the said arms. The upper wall 7 of the compartment 1 is provided with an arcuate wall 8 corresponding with the circular periphery of the disk 5, the said wall 8 being of a width approximately equaling the distance between the adjacent pairs of right angularly arranged arms 6. The wall is provided with a covering of reticulated material 9, the same being projected above the disk and the arms of the disk to approximately the center portion or that occupied by the shaft 4 of the said disk. The reticulated top 9 has its longitudinal edge provided with a plurality of spaced members or arms 10, the same being so arranged as to freely pass between the spaced arms 6 when the disk 5 is revolved. The arcuate wall 8 of the device is provided adjacent the arms 10 with an opening 11, the latter communicating with a suitable cage 12. The cage 12 is preferably constructed of some suitable reticulated material, and is also preferably removably connected with the housing 1 so that insects deposited within the receptacle, in a manner hereinafter more clearly to be set forth may be destroyed without the necessity of moving the housing 1 and the mechanism connected therewith. The opening 11 is normally closed by a preferably reticulated door 13, the latter being attached to the upper arm 14 of a substantially U-shaped member 15 and the said member being pivoted to the wall 8 as at 16. The lower arm 17 of the member 15 is arranged at an angle, as clearly illustrated in Fig. 3 of the drawings and the reticulated plate 9 directly above the door 13 is provided with an opening so that the said door may be free to rise when the inclined member 17 is contacted by the upper arms 6 carried by the shaft 4.

In operation, the disk 5 is provided with some suitable bait and it will be noted that the disk, revolving slowly in the direction of the arrow illustrated in Fig. 2 of the drawing, will carry the insects below the wall 9 and between the adjacent arms 6 of the device so that when the said insects are thus positioned their escape is entirely prevented. As the disk 5 continues its revolution the upper arm 6 of each of the series will contact with the member 17 of the pivoted hinge 15 of the door 13, causing the same to rise to permit the entrance within the opening 11 of the cage 12 of the insects, it being understood that the insects are prevented from escaping in an opposite direction through the medium of the spaced members 10.

From the above description, taken in connection with the accompanying drawing, it will be noted that I have provided an extremely simple and effective device for the purpose intended, and while I have illustrated and described the preferred embodiment of the improvement, as it now appears to me, minor details of construction, within the scope of the following claims may be resorted to if desired.

Having thus fully described the invention, what I claim as new is:—

1. In a device of the class described, a motor, a shaft for said motor, a disk upon the shaft, a plurality of radially arranged arms upon said shaft and positioned above the disk, a cage, said cage being provided with an entrance opening, a swinging door for said opening, and said door being provided with an inclined member adapted to be contacted by one of the arms of the disk to raise the door as the disk is rotated.

2. In a trap for insects, a housing, a motor within the housing, a disk connected with the motor, a plurality of radiating arms upon the disk, said arms being arranged in series and disposed one above the other, an arcuate wall upon the housing, a rectangular top for the wall, said wall being provided with an opening, a plurality of longitudinally extending members adjacent this opening, a door for the opening, said door being provided with a pivoted arm, said arm comprising an upper and a lower inclined member, the lower inclined member adapted to lie within the path of the arms of the disk, and a removable cage connected with the housing and being provided with an opening communicating with the opening of the arcuate wall.

3. In a trap for insects, a disk, means for rotating the disk, a shaft upon the disk, a plurality of spaced right angularly arranged arms connected with the shaft, a compartment arranged adjacent the periphery of the disk and of a distance equaling the distance between two of the series of arms provided on the shaft, said compartment overlying the arms of the disk, said compartment having one of its edges composed of a plurality of spaced members terminating adjacent the shaft on the disk, a housing connected with the compartment, a door for the connection between the housing and the compartment, said door having a pivotal connection with the housing, the pivotal connection of said door being provided with a downturned arm adapted to be contacted by one of the series of arms upon the disk to swing the door upward to an open position.

In testimony whereof I affix my signature in presence of two witnesses.

JOSEPH GIDEON MONCUS.

Witnesses:
   ALEX. C. McBEE,
   N. E. RENDALL.